Figure 1:
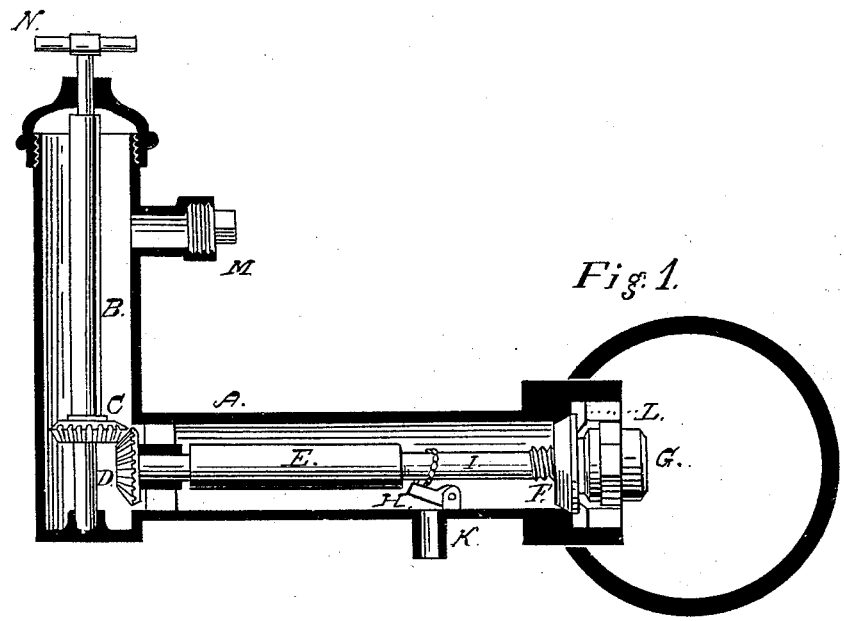

R. SMEATON.
Anti-Freezing Hydrants.

No. 168,422.  Patented Oct. 5, 1875.

WITNESSES:
L B Smith
A Schattenberg

INVENTOR:
Robert Smeaton

UNITED STATES PATENT OFFICE.

ROBERT SMEATON, OF MILWAUKEE, WISCONSIN.

IMPROVEMENT IN ANTI-FREEZING HYDRANTS.

Specification forming part of Letters Patent No. 168,422, dated October 5, 1875; application filed July 15, 1875.

*To all whom it may concern:*

Be it known that I, ROBERT SMEATON, of Milwaukee, in the county of Milwaukee, in the State of Wisconsin, have invented certain Improvements in Anti-Freezing Hydrants, of which the following is a specification:

The object of my invention is to prevent the freezing of hydrants. It is a hydrant with a couple of shafts and gearing connected with a valve, which, by a screw, is thrown open at the main, and another valve for the purpose of emptying the pipe when the main valve is closed. When the shafts are turned and the main valve opened, the chain which is connected with the waste-valve is loosened, and the valve is closed and the water is kept in the pipe; but when the shaft is turned and the main valve closed, then the chain, being wound around the shaft, pulls on the waste-valve and opens it, and lets the water run out to the sewer.

Figure 1 is a sectional view of my invention.

A is the pipe of the hydrant; B, the upright shaft, which is turned to operate the valve; C, a bevel-pinion on same; D, a bevel-pinion meshing into same on the shaft which is connected with the valve; E, the valve-shaft; F, the main valve; G, a cap which screws on over the end of the stem of the valve to prevent the water from leaking out round the screw on the end of shaft E, on which is the valve working on a screw; H, the waste-valve; I, chain attached to the waste-valve and the shaft of the main valve; K, outlet to the sewer; L, a stop on the main valve, which works in a groove in the pipe to prevent the valve from turning when the shaft is turned; M, the plug from which water is drawn from the hydrant; N, a handle on the top of upright shaft to turn same with, but is not intended to be on a hydrant when in use, but a square top for a wrench instead will be used.

The operation of my invention is as follows: When water is wanted from the hydrant, turn the shaft B, and that will turn E and work the screw on the end of same in the valve, and that will push F from the seat and let the water flow, and the chain I will be loosened and the valve H closed, and the water will flow through the pipe to plug M; and when it is necessary to close the valve and shut off the water, turn the shaft by a reverse motion, and the valve F will be closed, and the chain I will be drawn on by being wound round shaft E, and open valve H, and the water outside of valve F will be run off to the sewer.

I claim as my invention—

Valve H, operated by chain I, in combination with valve shaft E and valve F, provided with stops L and caps G.

ROBERT SMEATON.

Witnesses:
J. B. SMITH,
H. C. KOCH.